US011895759B2

(12) United States Patent
Sasagawa et al.

(10) Patent No.: US 11,895,759 B2
(45) Date of Patent: Feb. 6, 2024

(54) INDUCTION HEATING APPARATUS

(71) Applicant: Samsung Electronics Co., Ltd., Suwon-si (KR)

(72) Inventors: Masashi Sasagawa, Yokohama (JP); Masaki Ono, Yokohama (JP); Masayuki Otawara, Yokohama (JP); Nobuharu Nishikoori, Yokohama (JP); Taro Yoshida, Yokohama (JP); Tomoyuki Kanagawa, Yokohama (JP); Yutaka Yagi, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 413 days.

(21) Appl. No.: 17/192,239

(22) Filed: Mar. 4, 2021

(65) Prior Publication Data

US 2021/0298134 A1 Sep. 23, 2021

(30) Foreign Application Priority Data

Mar. 18, 2020 (JP) ................................ 2020-047466
Dec. 30, 2020 (KR) ........................ 10-2020-0187185

(51) Int. Cl.
*H05B 6/08* (2006.01)
*H05B 6/12* (2006.01)

(52) U.S. Cl.
CPC ............. *H05B 6/08* (2013.01); *H05B 6/1272* (2013.01); *H05B 2213/05* (2013.01)

(58) Field of Classification Search
CPC ...... H05B 2213/05; H05B 6/062; H05B 6/08; H05B 6/1272
USPC ....... 219/626, 621, 622, 624, 625, 627, 663, 219/671, 675, 676
See application file for complete search history.

(56) References Cited

U.S. PATENT DOCUMENTS

2016/0323937 A1* 11/2016 Anton Falcon .......... H05B 6/04
2021/0219390 A1* 7/2021 Kanagawa ............. H05B 6/062

FOREIGN PATENT DOCUMENTS

JP 6116491 A 1/1986
JP 3843528 B2 11/2006
JP 2008-293888 A 12/2008

* cited by examiner

*Primary Examiner* — Quang T Van
(74) *Attorney, Agent, or Firm* — Jefferson IP Law, LLP

(57) ABSTRACT

An induction heating apparatus is provided. The induction heating apparatus includes a heating coil configured to heat an object to be heated, a full-bridge type inverter configured to supply power to the heating coil, a capacitor provided between an intermediate node of one arm of the inverter and one end of the heating coil, and a first relay provided between the intermediate node and the other end of the heating coil 30. An intermediate node of the other arm of the inverter and an intermediate point of the heating coil are connected through a first wire. The induction heating apparatus includes a processor configured to open or close the first relay based on an impedance of the object to be heated.

18 Claims, 19 Drawing Sheets

INDUCTION HEATING APPARATUS

CROSS-REFERENCE TO RELATED APPLICATION(S)

This application is based on and claims priority under 35 U.S.C. § 119(a) of a Korean patent application number 10-2020-0187185, filed on Dec. 30, 2020, in the Korean Intellectual Property Office, and of a Japanese patent application number 2020-047466 filed on Mar. 18, 2020 in the Japanese Patent Office, the disclosure of each of which is incorporated by reference herein in its entirety.

BACKGROUND

1. Field

The disclosure relates to an induction heating apparatus using a heating coil.

2. Description of Related Art

Patent Document 1 discloses an induction heating cooker in which a series resonant circuit is provided with a heating coil capable of selecting the number of windings and a resonant capacitor with variable capacity, and the series resonant circuit is excited by a bridge type inverter circuit.

RELATED ART DOCUMENT (Patent Document 1) Japanese Unexamined Patent Application Publication No. 4-75635.

The above information is presented as background information only to assist with an understanding of the disclosure. No determination has been made, and no assertion is made, as to whether any of the above might be applicable as prior art with regard to the disclosure.

SUMMARY

Recently, there has been a demand for miniaturization and thickness reduction of induction heating (IH) cooking heaters using an induction heating apparatus. However, in the technique of Patent Document 1, at least two resonant capacitors are required. In addition, as for the circuit configuration of Patent Document 1, it is required to increase the size of the resonant capacitor, and thus the miniaturization and thickness reduction may be hindered.

In addition, there are containers with significantly different impedances such as aluminum containers and iron containers, but there are cases in which impedances are different even between the same iron containers, such as when using a composite material.

Aspects of the disclosure are to address at least the above-mentioned problems and/or disadvantages and to provide at least the advantages described below. Accordingly, an aspect of the disclosure is to provide an induction heating apparatus capable of reducing a size thereof as small as possible and capable of performing a heating operation by using a circuit suitable for a difference in an impedance.

Additional aspects will be set forth in part in the description which follows and, in part, will be apparent from the description, or may be learned by practice of the disclosure.

In accordance with an aspect of the disclosure, an induction heating apparatus is provided. The induction heating apparatus includes a heating coil configured to heat a container, an inverter comprising a plurality of switching elements and configured to supply power to the heating coil, a first relay provided between a first node of the arm and one end of the heating coil, the first node being disposed between the plurality of switching elements, and a processor configured to detect the container based on an output current of the converter and open or close the first relay based on a detection result of the container.

A series resonant circuit and a parallel resonant circuit may be switched according to an impedance of the object to be heated. In addition, by connecting the output of the inverter to the intermediate point of the heating coil, a heating operation using all windings of the heating coil and a heating operation using some windings may be switched. In the case of an object to be heated, such as a stainless steel container having a relatively high impedance, the series resonant circuit may be used. Further, an inductance of the series resonant circuit may be adjusted. Therefore, in a case of the object to be heated such as the same stainless steel container having a relatively high impedance or a relatively low impedance according to a difference in grade and size, the object to be heated may be heated by using a circuit corresponding to a difference in an impedance. Accordingly, it is possible to increase the type of object to be heated that is heated up to the maximum power consumption. In a case in which the parallel resonant circuit is formed by adding a relay, the impedance of the object to be heated and a combined impedance of the heating coil and the capacitor may be maximized near a resonance frequency. Therefore, by using the parallel resonant circuit, the current flowing through the inverter may be reduced even when heating the object to be heated having a relatively low impedance.

In accordance with another aspect of the disclosure, an induction heating apparatus is provided. The induction heating apparatus includes a heating coil configured to heat a container and including a first heating coil, a second heating coil, and an intermediate point to which the first heating coil and the second heating coil are connected, an inverter provided in the form of a full bridge in which a first arm and a second arm are connected in parallel, the inverter configured to supply power to the heating coil, a capacitor provided between an end of the first heating coil and a first node of the first arm of the inverter, a first relay provided between a second node of the second arm of the inverter and an end of the second heating coil, a second relay provided between the second node of the inverter and the intermediate point of the heating coil, and a processor configured to detect the container based on an output current of the inverter and open one of the first relay and the second relay and close the other of the first relay and the second relay based on a detection result of the container.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness. Further, terms including ordinal numbers such as "first" and "second" are used to distinguish components, and the ordinal numbers used do not designate the arrangement order, operation order, or importance of the components. Terms such as "unit", "module", "member", and "block" used in the description may be implemented as software or hardware, and a plurality of "units", "modules", "members", and "blocks" is implemented as a single component according to embodiments. Alternatively, one "unit", "module", "member", and "block" may include a plurality of components.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
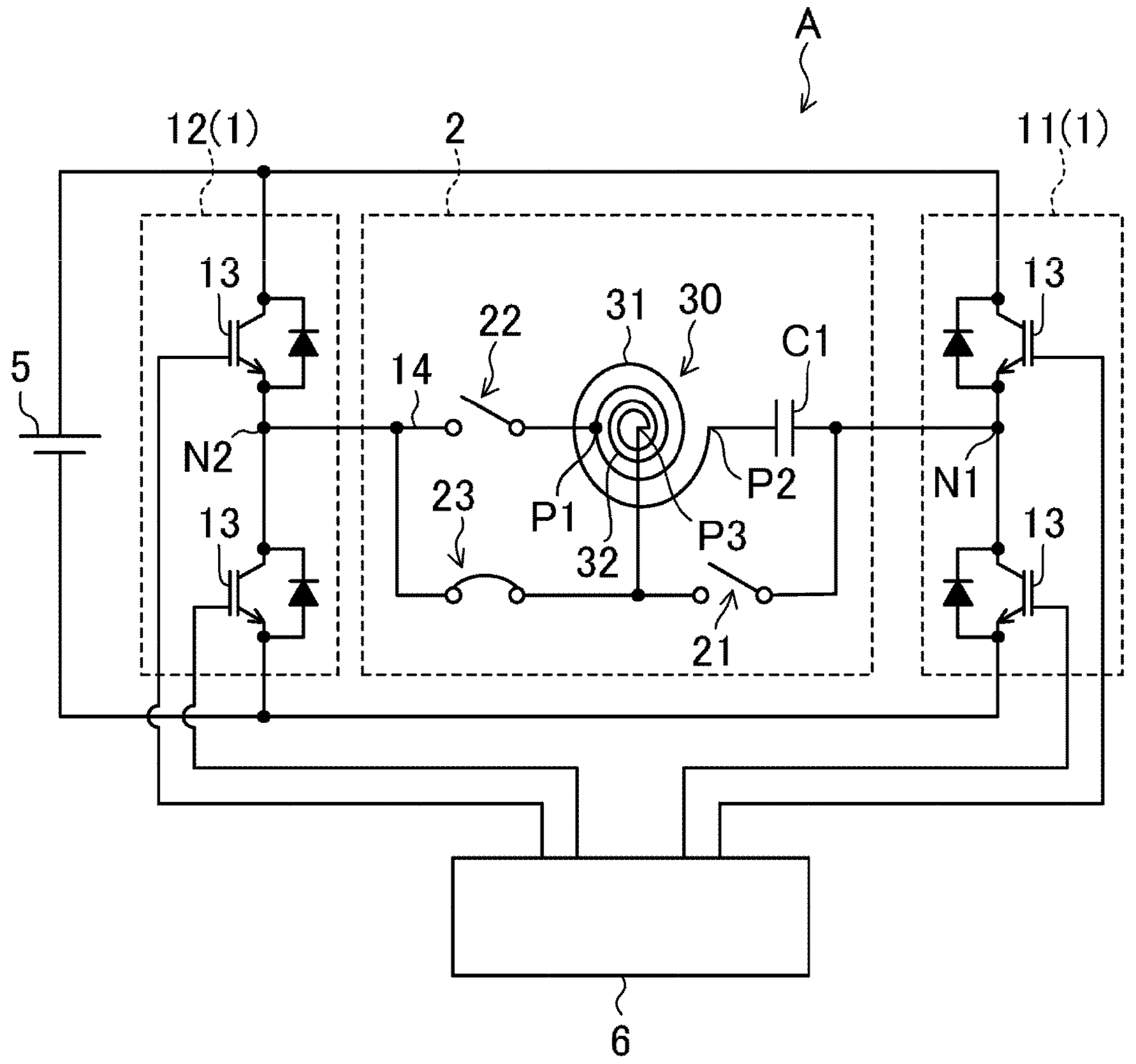
FIG. 1 is a view illustrating an example of a configuration of an induction heating apparatus according to an embodiment of the disclosure.
Figure 2:
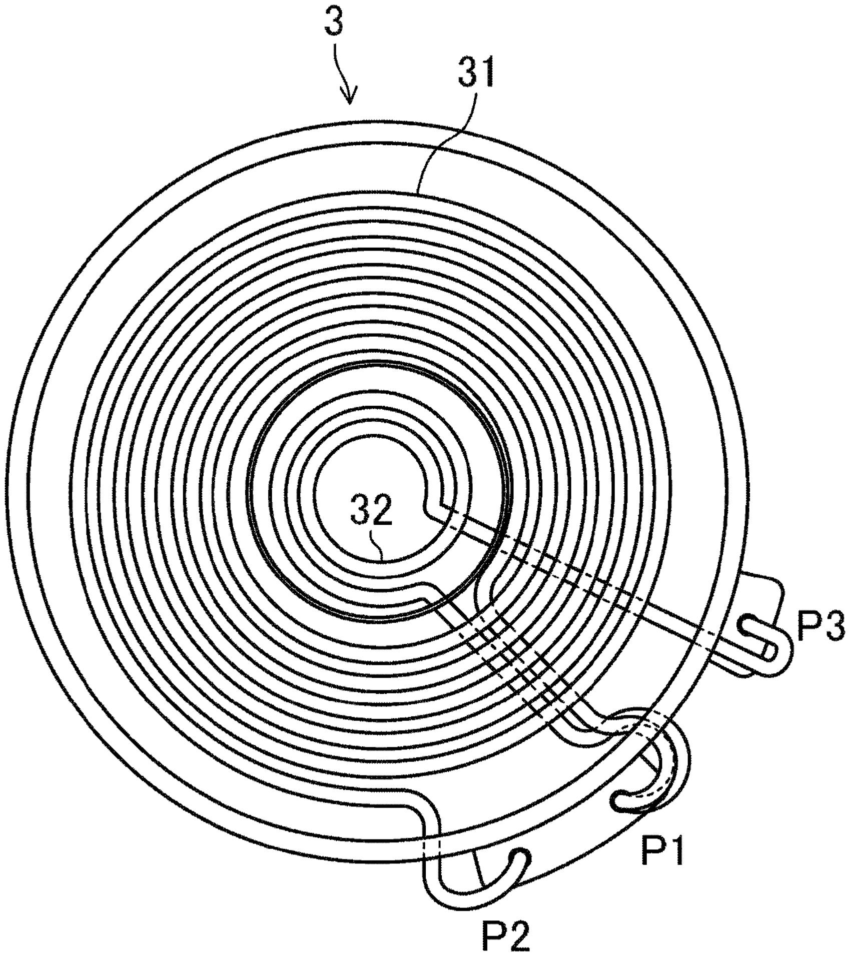
FIG. 2 is a plan view illustrating an example of a configuration of a heating coil according to an embodiment of the disclosure.

FIG. 1 is a view illustrating an example of a configuration of an induction heating apparatus A according to an embodiment of the disclosure. FIG. 2 is a plan view illustrating an example of a configuration of a heating coil according to an embodiment of the disclosure.

Referring to FIG. 1, the induction heating apparatus A includes an inverter 1 configured to convert direct current (DC) power, which is input from a DC power source 5, into alternating current (AC) power and output the AC power, a resonant circuit 2 including a heating coil 30 configured to generate heat by receiving the power from the inverter 1, and a controller 6.

For example, the inverter 1 is a full-bridge type inverter in which two pairs of arms 11 and 12 are connected in parallel. Referring to FIG. 1, two switching elements 13 are connected in series in the two pairs of arms 11 and 12, respectively. Further, each switching element 13 is composed of a parallel circuit including a transistor and a diode connected to the transistor in parallel and reverse directions. Accordingly, in the inverter 1, each switching element 13 is switched under the control of the controller 6 and thus DC power is converted into AC power and then the AC power is output. In the following description, an intermediate node between opposite switching elements 13 of one arm (first arm 11) is referred to as a first node N1, and an intermediate node between opposite switching elements 13 of the other arm (second arm 12) is referred to as a second node N2. That is, the resonant circuit 2 is provided between the first node N1 and the second node N2. "Intermediate node" in the embodiment represents a contact point provided at a position between the switching elements 13. Further, the circuit configuration of the inverter 1 is not limited to the configuration of FIG. 1, and other known configurations (for example, a single bridge circuit) may be applied according to the related art.

Referring to FIG. 2, the heating coil 30 is spirally wound along a predetermined direction, and an intermediate point P1 positioned in the middle thereof and a second node N2 are connected by a first wire 14. That is, the heating coil 30 of FIG. 2 is a single burner coil housed in the same plane, and is divided into a first heating coil 31 and a second heating coil 32 by the intermediate point P1 as a boundary. The first heating coil 31 is an annular coil, and the second heating coil 32 is arranged on an inner side of the first heating coil 31. Referring to FIG. 2, P2 represents an end of the first heating coil 31 on the opposite side to the intermediate point P1, and P3 represents an end of the second heating coil 32 on the opposite side of the intermediate point P1. According to the embodiment, the end P2 of the first heating coil 31 corresponds to one end of the heating coil 30, and the end P3 of the second heating coil 32 corresponds to the other end of the heating coil 30.

Referring to FIG. 2, a single burner coil housed in the same plane is illustrated as an example, but the shape of the heating coil 30 is not limited thereto. For example, a coil including two or more layers formed by stacking coils of the same diameter may be used as the heating coil 30. In addition, in a state in which the heating coil 30 is composed of two or more layers, the first heating coil 31 and the second heating coil 32 may be divided for each layer.

Figure 13A:
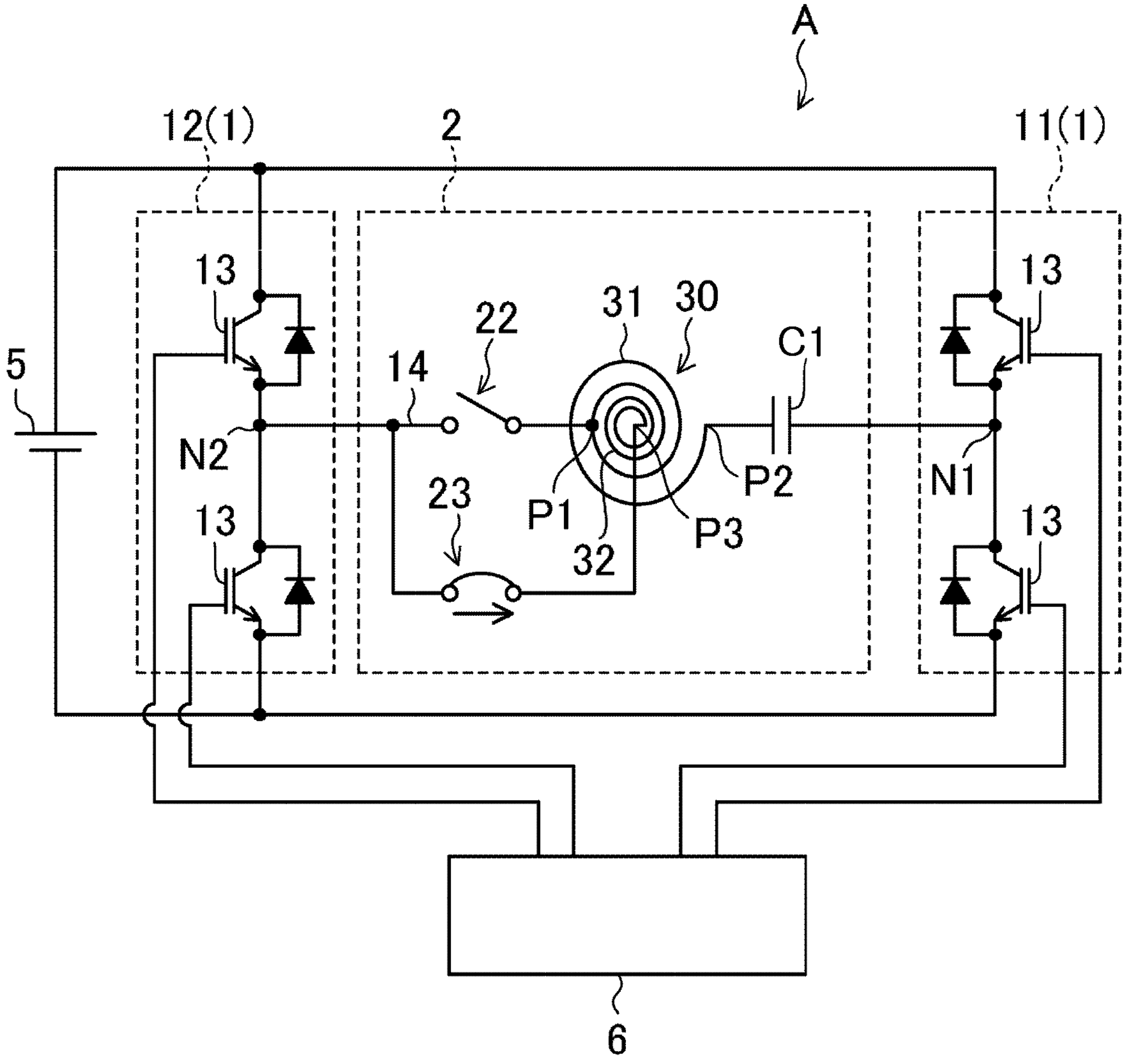
FIG. 13A is s view illustrating of still another example of the configuration of the induction heating apparatus according to an embodiment of the disclosure.
Figure 13B:
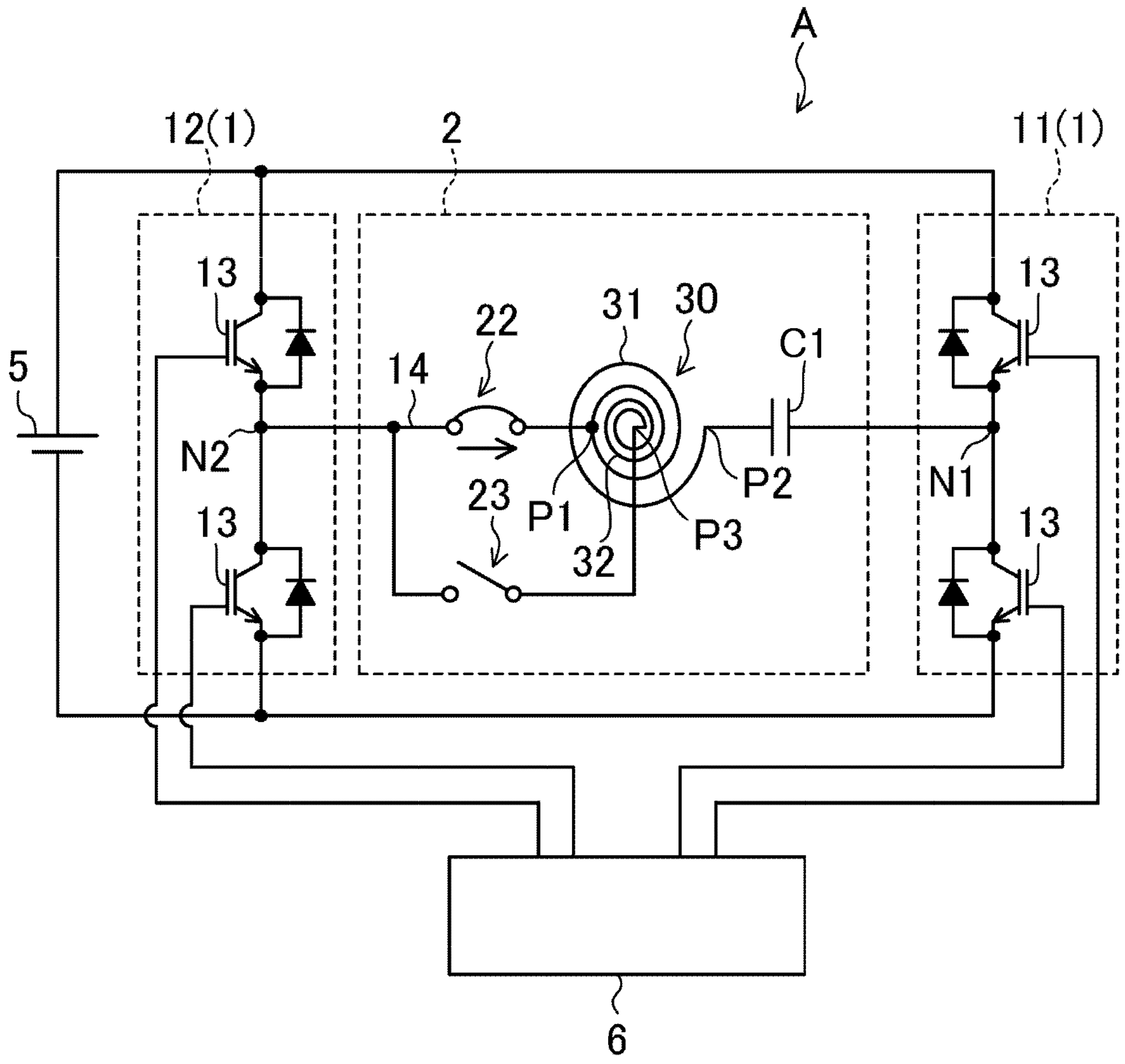
FIG. 13B is s view illustrating of still another example of the configuration of the induction heating apparatus according to an embodiment of the disclosure.

Referring to FIG. 1 again, a capacitor C1 is provided between the first node N1 and the end P2 of the first heating coil 31. As for a circuit configuration capable of heating a container having a low impedance, such as an aluminum container, a first relay 21 is provided between the first node N1 and the end P3 of the second heating coil 32. A second relay 22 is provided between the second node N2 and the intermediate point P1 of the heating coil 30. In other words, the second relay 22 is provided on the first wire 14. A third relay 23 is provided between the second node N2 and the end P3 of the second heating coil 32. In the case of a specification in which the aluminum container is not heated, a resonant circuit may be formed as a circuit without the first relay 21 referring to FIGS. 13A and 13B. Referring to FIGS. 13A and 13B, configurations other than the first relay 21 are the same as those of FIG. 1. FIG. 13A illustrates that the second relay 22 is turned off and the third relay 23 is turned on according to an embodiment of the disclosure, and FIG. 13B illustrates that the second relay 22 is turned on and the third relay 23 is turned off according to an embodiment of the disclosure. A state in which the relays 21, 22, and 23 are turned on means that the relays 21, 22, and 23 are closed, and a state in which the relays 21, 22, and 23 are turned off means that the relays 21, 22, and 23 are opened. Further, because the ordinal numbers used for the first relay 21, the second relay 22, and the third relay 23 are to distinguish a plurality of relays, the ordinal number does not specify the arrangement order or operation order of the relays. Therefore, the name of the relays may be referred to in a different order. For example, the first relay 21 may be referred to as a third relay, and the third relay 23 may be referred to as a first relay.

Figure 3A:
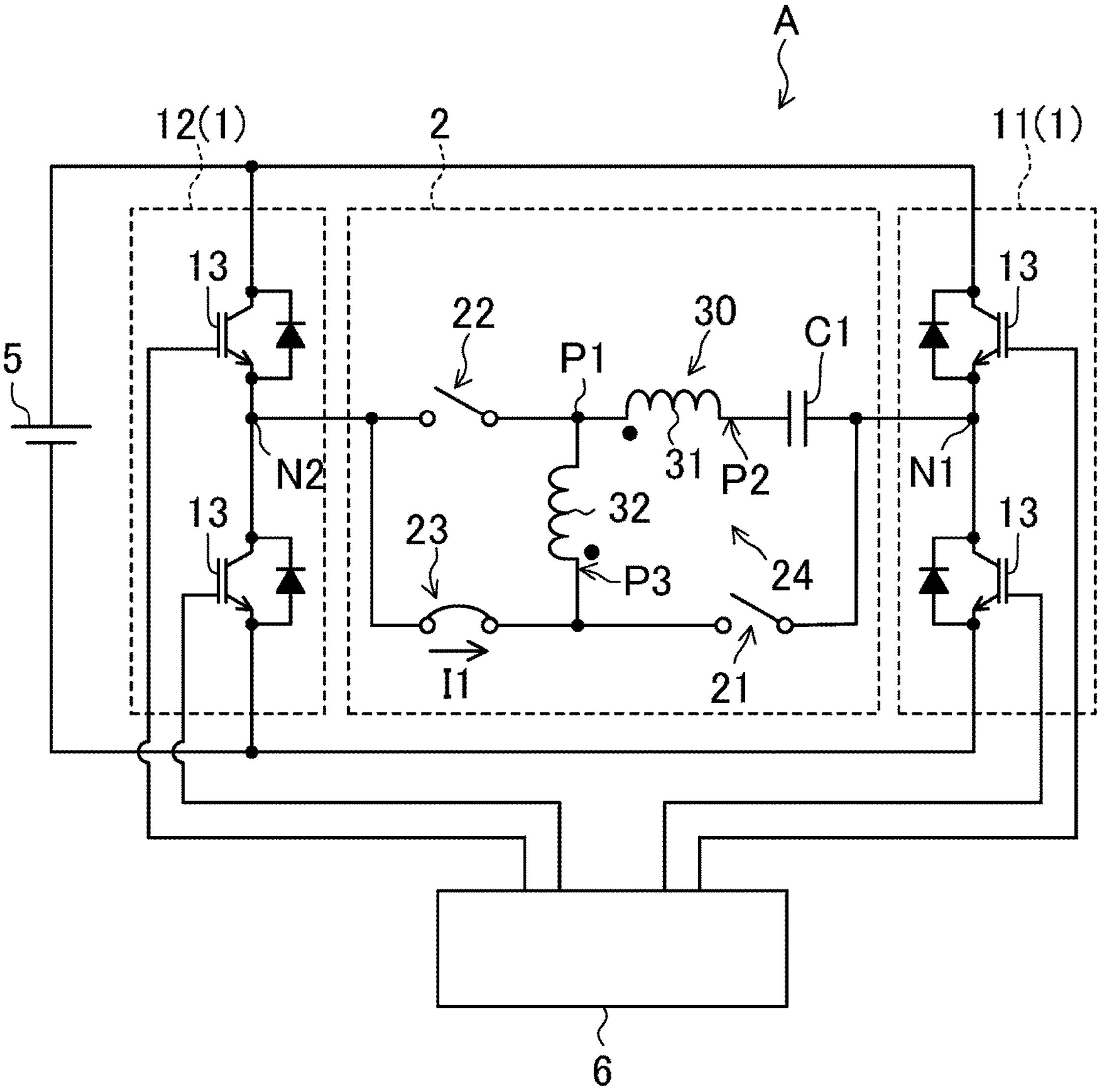
FIG. 3A is a circuit diagram in which a resonant circuit of FIG. 1 is replaced with an equivalent circuit according to an embodiment of the disclosure.
Figure 3B:
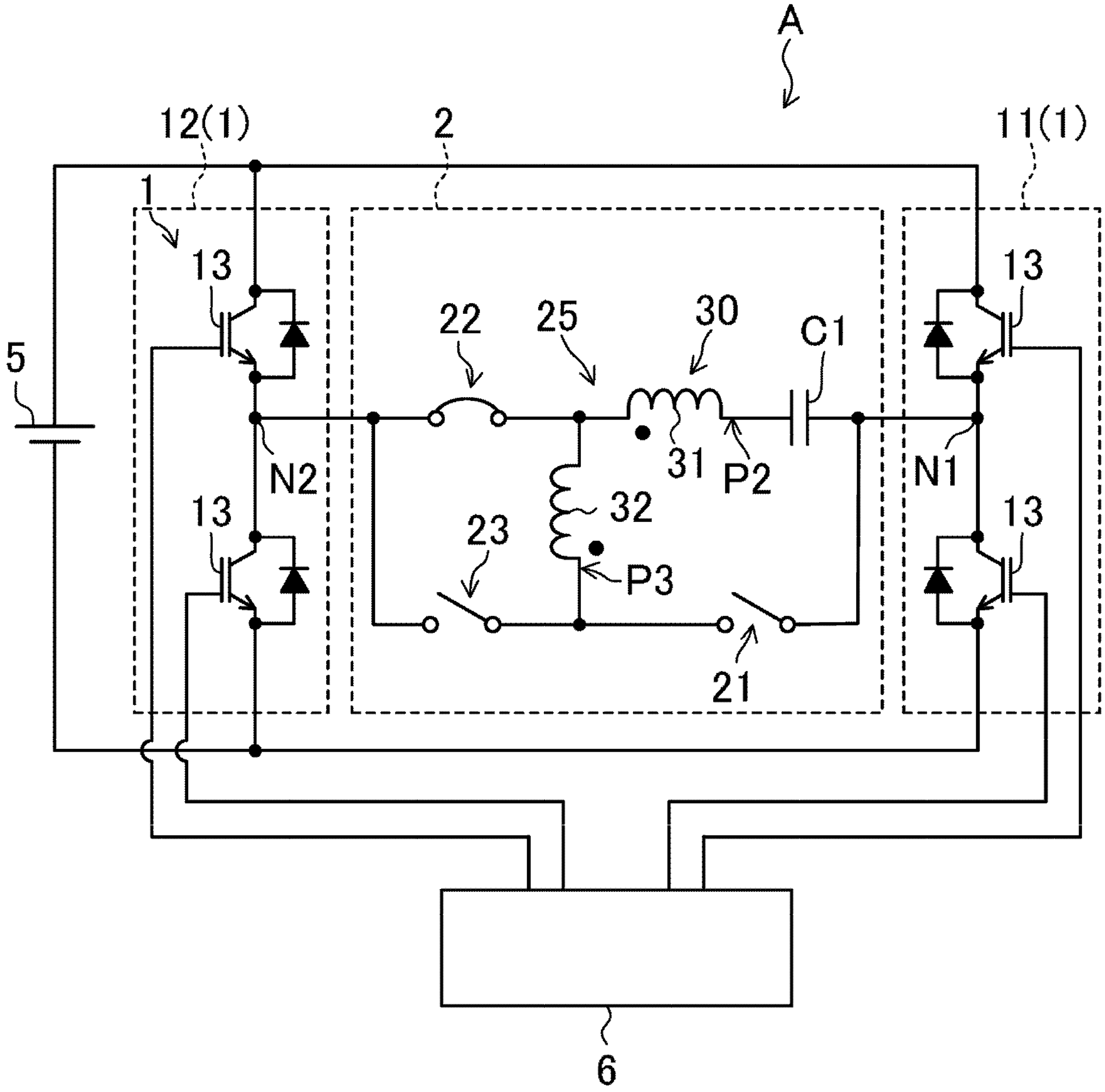
FIG. 3B is a circuit diagram in which the resonant circuit of FIG. 1 is replaced with an equivalent circuit according to an embodiment of the disclosure.
Figure 3C:
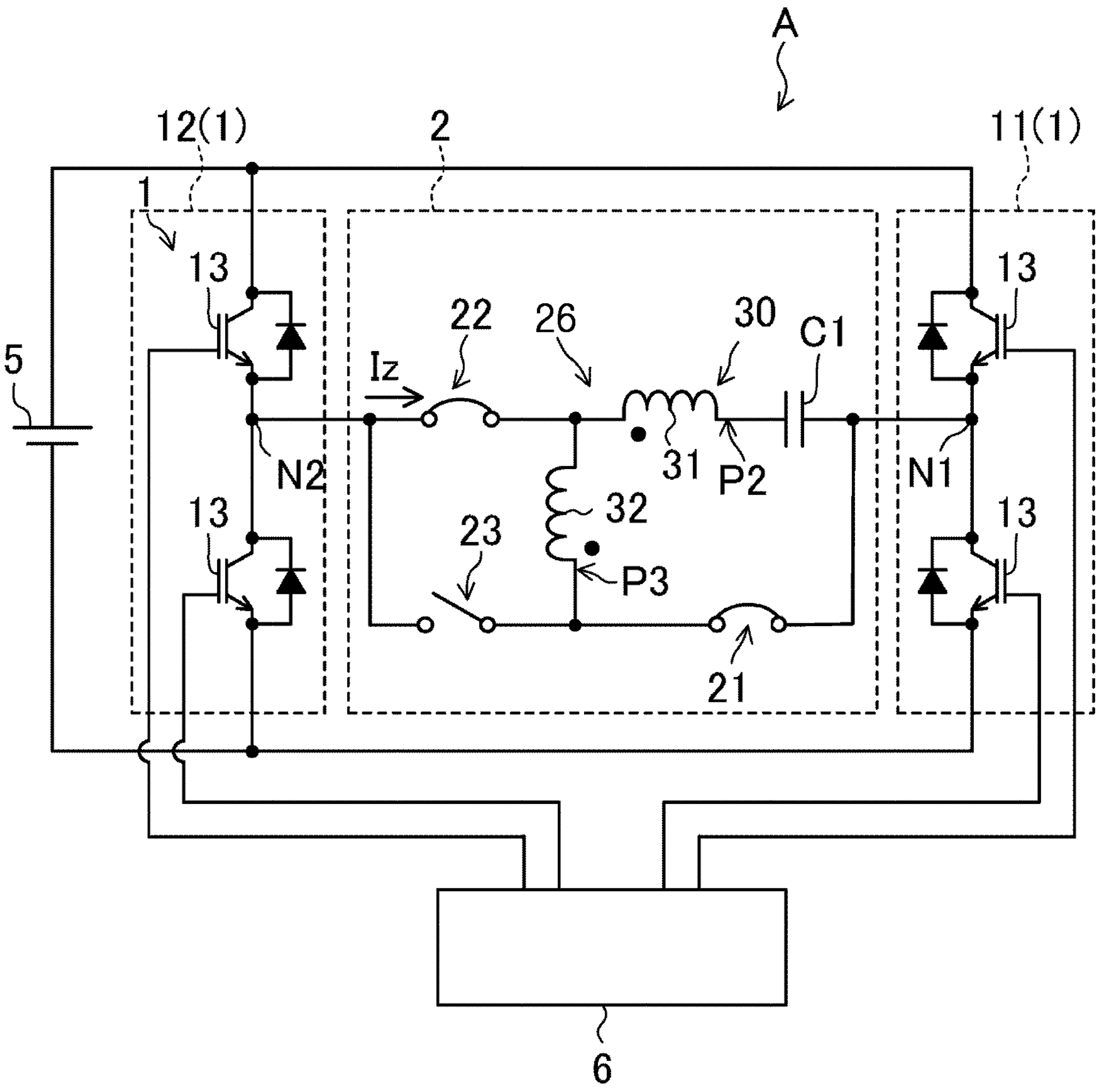
FIG. 3C is a circuit diagram in which the resonant circuit of FIG. 1 is replaced with an equivalent circuit according to an embodiment of the disclosure.

FIGS. 3A to 3C are circuit diagrams in which the resonant circuit 2 of FIG. 1 is replaced (substituted) with an equivalent circuit according to various embodiments of the disclosure. The resonant circuit 2 includes the first heating coil 31, the second heating coil 32, the capacitor C1, the first relay 21, the second relay 22, and the third relay 23 described above.

Referring to FIG. 3A, in response to the first relay 21 being turned off, the second relay 22 being turned off, and the third relay 23 being turned on, the resonant circuit 2 serves as a series resonant circuit in which the capacitor C1, the first heating coil 31, and the second heating coil 32 are connected in series between the first node N1 and the second node N2. Hereinafter the resonant circuit 2 having the set state of each of the relays 21, 22, and 23 in FIG. 3A is referred to as a first series resonant circuit 24. In the same manner as the resonant circuit 2 of FIG. 3A, the resonant circuit 2 of FIG. 13A is a series resonant circuit in which the capacitor C1, the first heating coil 31, and the second heating coil 32 are connected in series between the first node N1 and the second node N2.

Referring to FIG. 3B, in response to the first relay 21 being turned off, the second relay 22 being turned on and the third relay 23 being turned off, the resonant circuit 2 serves as a series resonant circuit in which the capacitor C1 and the first heating coil 31 are connected in series between the first node N1 and the second node N2. Hereinafter the resonant circuit 2 having the set state of each of the relays 21, 22, and 23 in FIG. 3B is referred to as a second series resonant circuit 25. In the same manner as the resonant circuit 2 of FIG. 3B, the resonant circuit 2 of FIG. 13B is a series resonant circuit in which the capacitor C1 and the first heating coil 31 are connected in series between the first node N1 and the second node N2.

Referring to FIG. 3C, in response to the first relay 21 being turned on, the second relay 22 being turned on and the third relay 23 being turned off, the resonant circuit 2 serves as a series-parallel resonant circuit in which the capacitor C1, the first heating coil 31, and the second heating coil 32 are connected in series and parallel between the first node N1 and the second node N2. Hereinafter the resonant circuit 2 having the set state of each of the relays 21, 22, and 23 in FIG. 3C is referred to as a series-parallel resonant circuit 26.

Operation of Induction Heating Apparatus

Next, the operation of the induction heating apparatus A will be described in detail referring to FIGS. 4A to 4C. In the following description, it will be described that an object to be heated is a container. However, an object to be heated is not limited to a container.

—Container Detection Process—

Figure 4A:
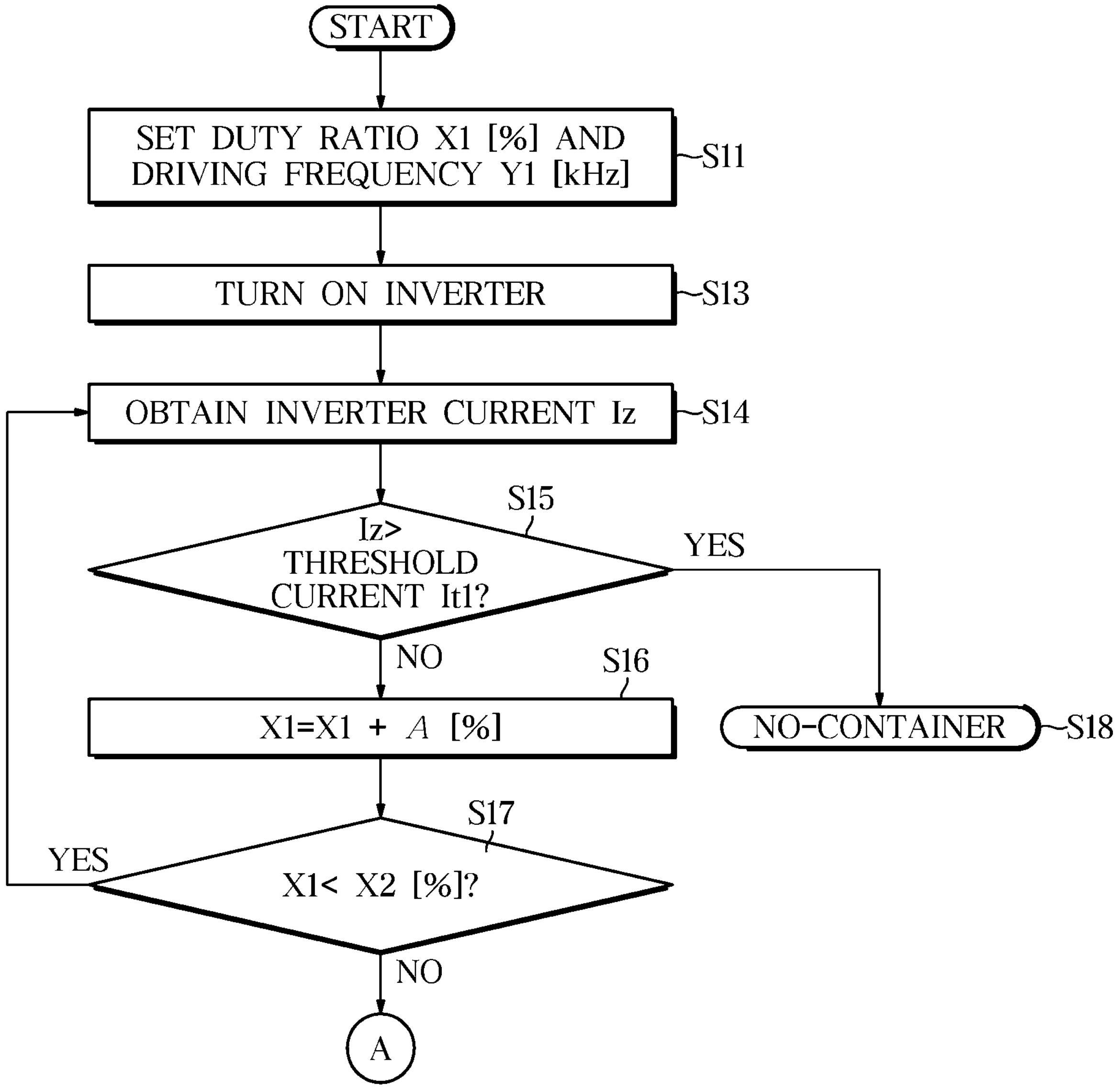
FIG. 4A is a flowchart illustrating an example of an operation of the induction heating apparatus according to an embodiment of the disclosure.

FIG. 4A is a flow chart of a container detection process for detecting a presence or absence of a container according to an embodiment of the disclosure.

Referring to FIG. 4A, in operation 11, the controller 6 obtains a first set value for detecting the presence or absence of a container. Particularly, the controller 6 obtains a set value of a driving frequency Y1 [kHz] and a set value of a duty ratio X1 [%] for driving each switching element 13. For example, the driving frequency Y1 [kHz] is set to a frequency near the resonant frequency in which is a container is not present. The resonant circuit 2 is set to the first series resonant circuit 24 or the second series resonant circuit 25.

At this time, although not shown, the set value may be obtained by using a set value that is pre-stored in a memory 8, which is built into the induction heating apparatus A, in the manufacturing or the set value may be obtained through an external network after being built into the home. The shape of the memory 8 is not particularly limited, and, for example, magnetic disks such as HDD, semiconductor memories such as random access memory (RAM), and optical disks such as DVD may be used. Although not shown, according to the embodiment, it is assumed that RAM is embedded in the induction heating apparatus A as the memory 8.

In operation 13, the controller 6 operates the inverter 1 based on the first set value obtained in operation 11.

In response to the start of the operation of the inverter 1, the controller 6 fixes the driving frequency Y1 [kHz] and determines whether or not an output current Iz of the inverter 1 exceeds a predetermined threshold value by adding a predetermined value $\alpha$ ($\alpha<(X2-X1)$) to the duty ratio from X1 [%] to X2 [%] ($X1<X2$).

Figure 5:
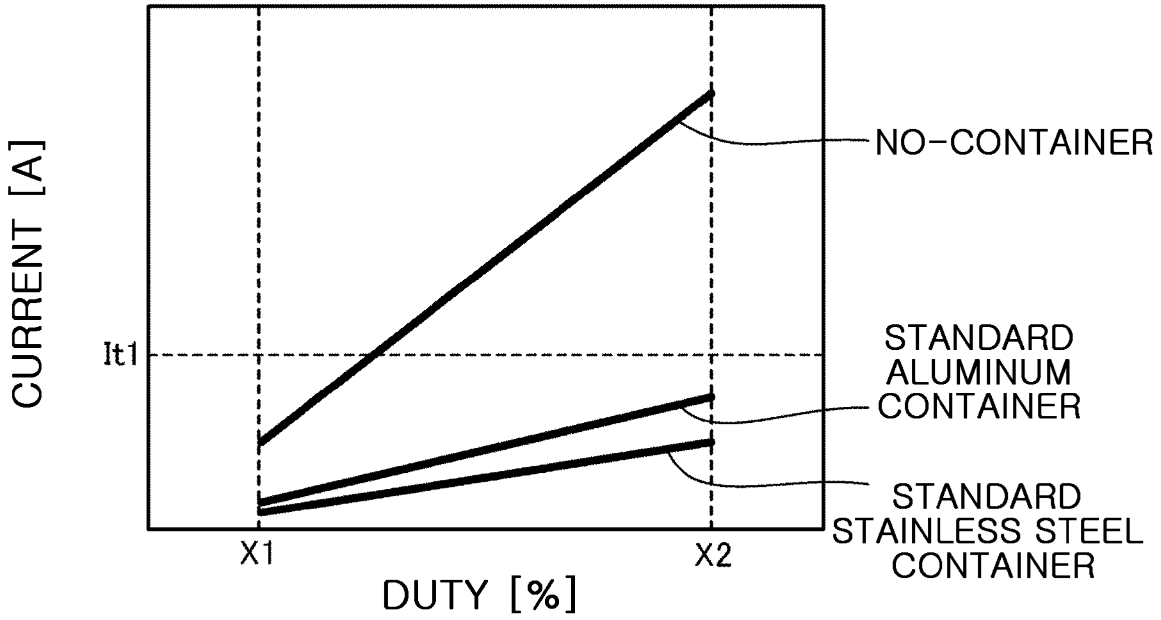
FIG. 5 is a graph illustrating an operation according to the flow of FIG. 4A according to an embodiment of the disclosure.

FIG. 5 illustrates an example of a change in an output current of the inverter 1 based on the duty ratio increased from X1 [%] to X2 [%] according to an embodiment of the disclosure.

Referring to FIG. 5, it illustrates characteristics in cases such as a case in which a container is not present on the heating coil 30 (hereinafter referred to as "no-container"), a case in which an object to be heated is a standard aluminum container (hereinafter referred to as "first aluminum container"), and a case in which an object to be heated is a standard stainless steel (Steel Type Stainless, Stainless Steel or Steel Use Stainless) container (hereinafter referred to as "first stainless container"). A specific flow is indicated by from operation 14 to operation 18.

Referring to FIG. 4A, in operation 14, the output current of the inverter 1 is obtained using an ammeter 9. In operation 15, the controller 6 determines whether the output current Iz of the inverter 1 exceeds a predetermined first threshold current value It1. Based on the determination in which the output current Iz of the inverter 1 exceeds the first threshold current value It1 (yes in operation 15), the controller 6 determines that it is "no-container", and stops the driving of the inverter 1 without a heating operation, and then terminates the process (in operation 18). Although not shown, in response to terminating the process without the heating operation, it is possible to notify the abnormality through display or sound. In operation 16, based on the output current Iz of the inverter 1 being less than or equal to the first threshold current value It1 (no in operation 15), a new duty ratio X1 is obtained by adding α [%] to the duty ratio X1. In operation 17, the controller 6 determines whether or not the duty ratio X1 reaches X2 [%] and based on the determination in which the duty ratio X1 reaches X2 [%], the controller 6 terminates the container detection process and stops the driving of the inverter 1.

Referring to FIG. 5, for example, in a state in which there is no container as an object to be heated, in response to the duty ratio being X11[%] (X1<X11<) in a process of gradually changing the duty ratio from X1[%] to X2[%], the output current Iz of the inverter 1 exceeds the first threshold current value It1. Accordingly, the flow proceeds to operation 18, and the controller 6 terminates the container detection process, and stops the driving of the inverter 1. On the other hand, in the case of the standard aluminum container and the standard stainless steel container, even if the duty ratio reaches X2 [%], the output current Iz of the inverter 1 is less than or equal to the first threshold current value It1. Accordingly, the controller 6 determines that an object to be heated is present, and the flow proceeds to the next process (process in FIG. 4B).

—Determination Process of Heating Start Frequency for Aluminum Containers—

Figure 4B:
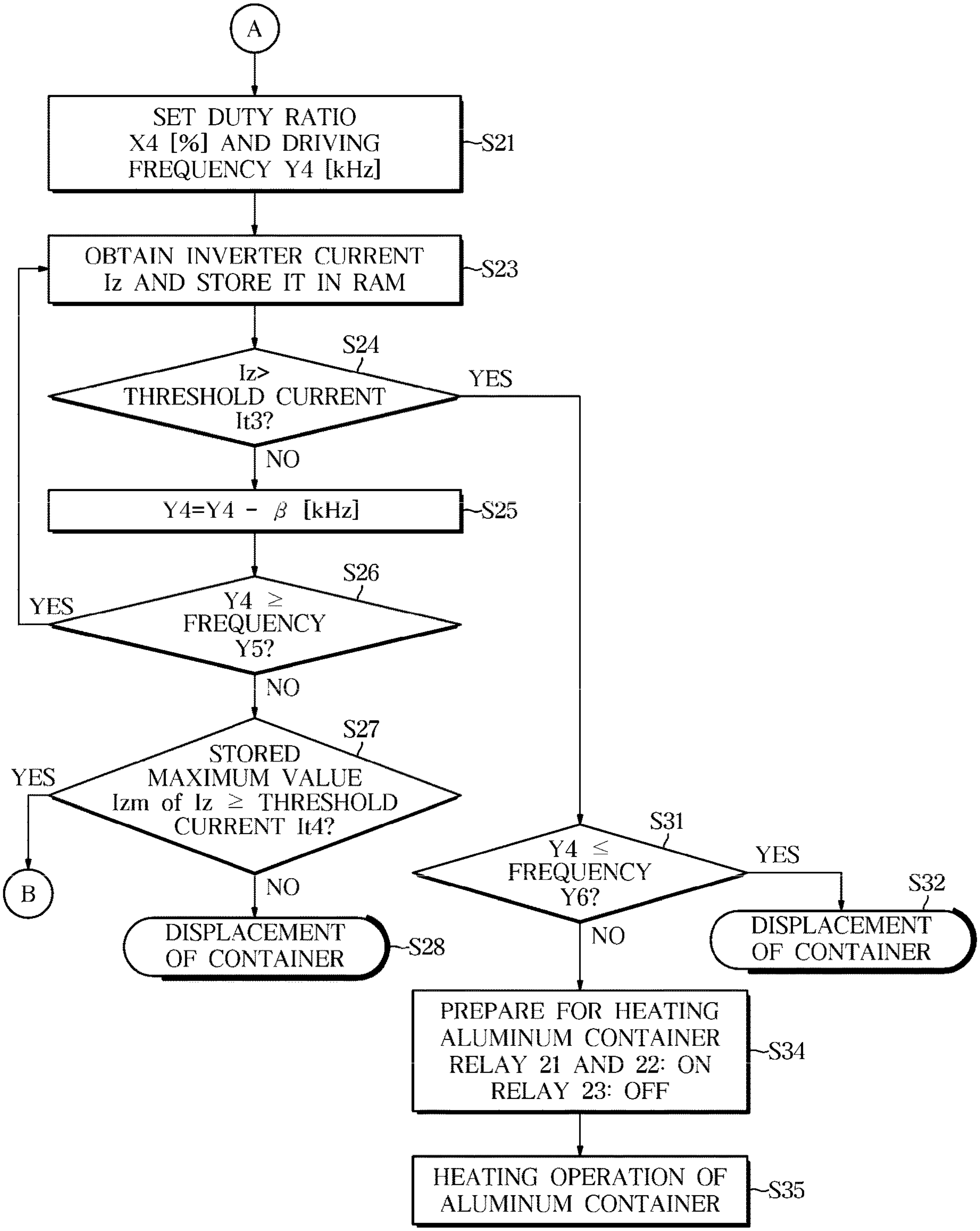
FIG. 4B is a flowchart illustrating an example of the operation of the induction heating apparatus according to an embodiment of the disclosure.

FIG. 4B is a flowchart illustrating a process for determining whether a container is an aluminum container or a stainless steel container, and a process for determining a heating start frequency in the case of the aluminum container according to an embodiment of the disclosure.

Referring to FIG. 4B, in operation 21, the controller 6 obtains a second set value. Particularly, the controller 6 obtains a set value of a driving frequency Y4 [kHz] and a set value of a duty ratio X4 [%] for driving each switching element 13. At this time, by conducting an experiment or simulation with containers of various metals that is formed of different materials, the duty ratio X4 [%] is set to a value that does not cause an abnormal current even when a container formed of any material is used. Storing the set value is performed in the same manner as the above-mentioned "container detection process". Further, at the start of the process of FIG. 4B, the resonant circuit 2 is set to the first series resonant circuit 24 or the second series resonant circuit 25.

In response to the termination of the setting in operation 21, the controller 6 fixes the duty ratio X4 [%], and stores the output current Iz of the inverter 1 in the RAM by subtracting a predetermined value β (β<(Y4−Y5)) from the driving frequency from Y4 [kHz] to Y5 [kHz] (Y4>Y5). The controller 6 identifies whether or not the output current Iz of the inverter 1 exceeds a predetermined second threshold current value It3 while storing the value. Because the driving frequency is reduced while fixing the duty ratio X4 [%], an on-time and an off-time of the switching element 13 are set to lengthen, respectively. In other words, the sweep of the driving frequency may be performed by adjusting a period in which the controller 6 turns on/off the switching element 13. In a condition in which the driving frequency sweeps from the Y4 to Y5, the second threshold current value It3 is set to a value exceeding the output current Iz in a case in which the object to be heated is an aluminum container, and the second threshold current value It3 is set to a value not exceeding the output current Iz in a case in which the object to be heated is a stainless steel container.

Figure 6:
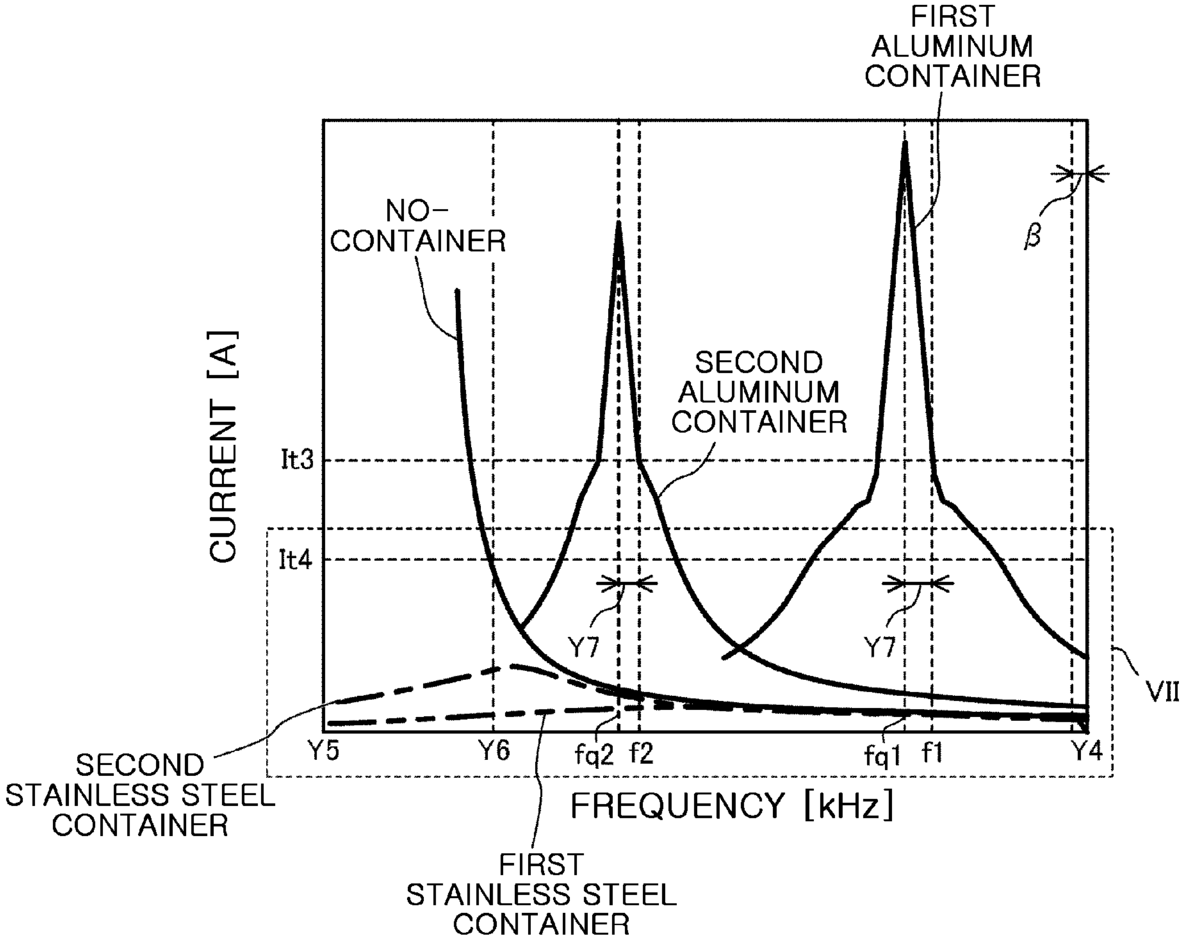
FIG. 6 is a graph illustrating an operation according to the flow of FIG. 4B according to an embodiment of the disclosure.
Figure 7:
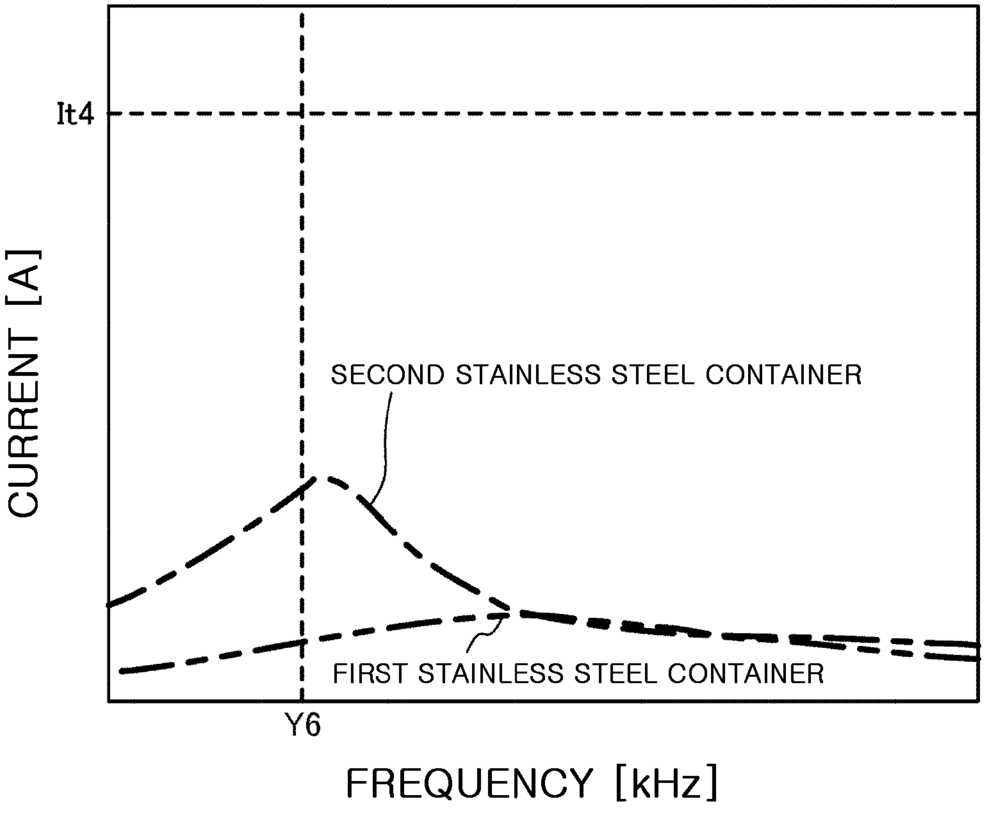
FIG. 7 is an enlarged view of a region VII of FIG. 6 according to an embodiment of the disclosure.

FIG. 6 illustrates an example of the change in the output current of the inverter 1 based on the driving frequency being reduced from Y4 to Y5 according to an embodiment of the disclosure. FIG. 7 is an enlarged view of a region VII of FIG. 6 according to an embodiment of the disclosure.

Referring to FIG. 6 and FIG. 7, it illustrates examples of characteristics in cases such as (1) a no-container state, (2) a case in which the object to be heated is the first aluminum (AL) container, (3) a case in which the object to be heated is a second aluminum container having a lower impedance than the first aluminum container, (4) a case in which the object to be heated is the first stainless steel container, and (5) a case in which the object to be heated is a second stainless steel container having a lower impedance than the first stainless steel container. Specific flow is indicated from operation 23 to operation 26.

Referring to FIG. 4B, in operation 23, the output current Iz of the inverter 1 is obtained using the ammeter 9 and stored in the RAM (not shown). In operation 24, the controller 6 determines whether or not the output current Iz of the inverter 1 exceeds the second threshold current value It3. In operation 25, based on the output current Iz being less than or equal to the second threshold current value It3 (no in operation 24), a new driving frequency Y4 is obtained by subtracting β [kHz] from the driving frequency Y4. In operation 26, the controller 6 determines whether or not the driving frequency Y4 reaches Y5, and repeats the process from operation 23 to operation 26 until the driving frequency Y4 reaches a frequency Y5.

Based on that the driving frequency Y4 reaches Y5 (no in operation 26), the process proceeds to operation 27. In operation 27, the controller 6 determines whether or not a maximum value Izm of the output current Iz stored in the above-described RAM is less than or equal to a predetermined third threshold current value It4 (It4<It3). The third threshold current value It4 is set to a current value that does not exceed the output current Iz in a case in which the object to be heated is a stainless steel container (referring to FIGS. 6 and 7). Based on the maximum value Izm exceeding the third threshold current value It4 (no in operation 27), the controller 6 determines that it is "displacement of container" and stops the driving of the inverter 1 without the heating operation, and then terminates the process (in operation 28).

Figure 4C:
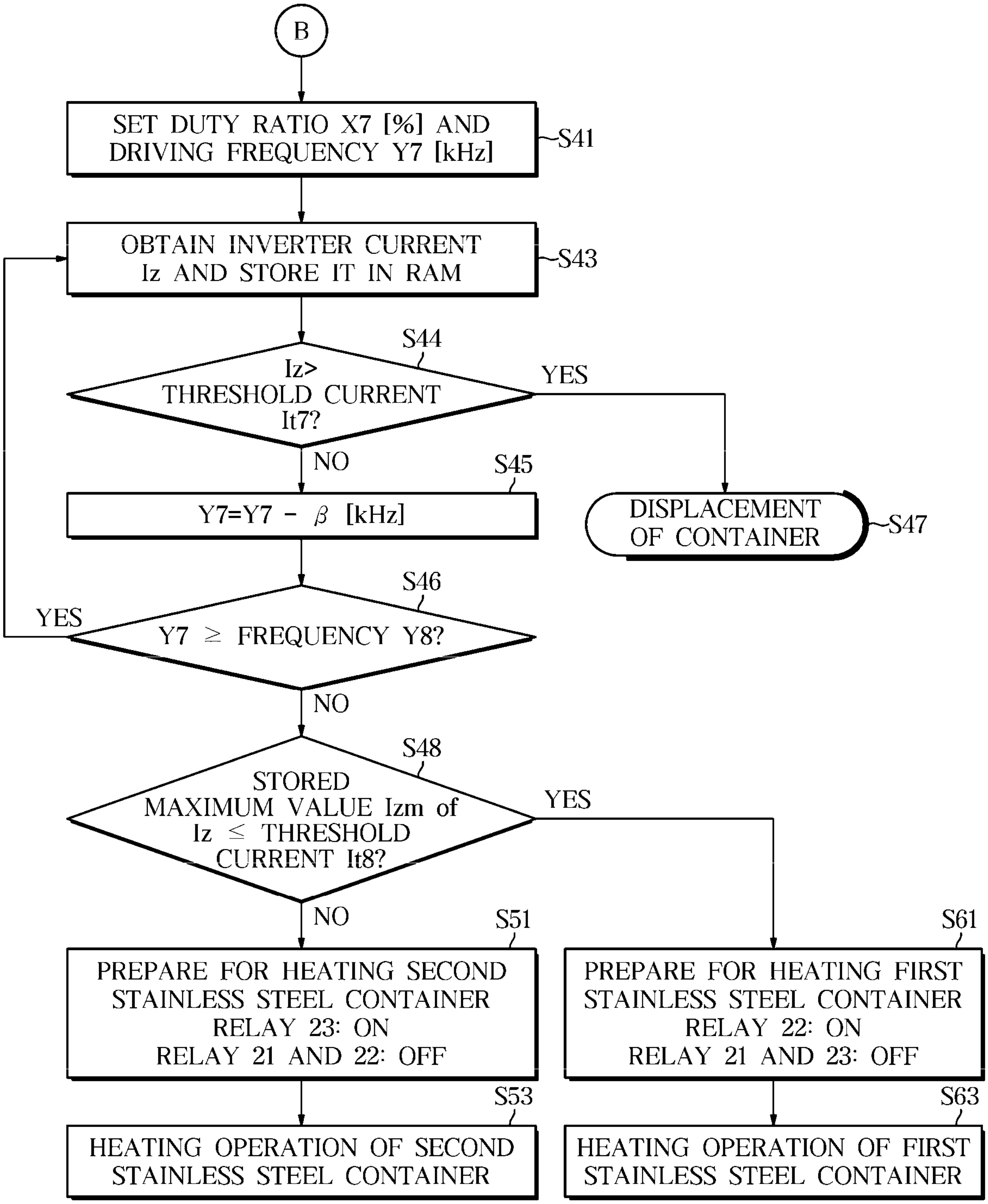
FIG. 4C is a flowchart illustrating an example of the operation of the induction heating apparatus according to an embodiment of the disclosure.

Based on the maximum value Izm being less than or equal to the third threshold current value It4 (yes in operation 27), the flow proceeds to the next process (process in FIG. 4C).

Based on the output current Iz exceeding the second threshold current value It3 (yes in operation 24), the process proceeds to operation 31, and whether or not the driving frequency Y4 is less than or equal to a predetermined threshold frequency Y6 (Y5<Y6<Y4) is determined. As shown in FIG. 6, the threshold frequency Y6 is a threshold value for determining "displacement of container", and the threshold frequency Y6 is set to a frequency slightly higher than a frequency in which the current rapidly increases in the case of "displacement of container". Based on the driving frequency Y4 being less than or equal to the threshold frequency Y6 (yes in operation 31), the controller 6 determines that it is "displacement of container", and stops the driving of the inverter 1 without the heating operation, and then terminates the process (operation 32).

Based on the driving frequency Y4 exceeding the threshold frequency Y6 (no in operation 31), the controller 6 determines that the object to be heated is the aluminum container, and stop the driving of the inverter 1 and prepares for heating of the aluminum container (operation 34). Particularly, the controller 6 turns on the first relay 21, turns on the second relay 22, and turns off the third relay 23, thereby forming the resonant circuit 2 as the series-parallel resonant circuit 26, referring to FIG. 3C. In addition, the controller 6 sets a value, which is obtained by subtracting a predetermined frequency Y7 from a frequency in which the output current Iz of the inverter 1 exceeds the second threshold current value It3, as an initial operating frequency for starting heating of the aluminum container. For example, in the example of FIG. 6, in the case in which the object to be heated is the first aluminum container, the output current Iz reaches the second threshold current value It3 in response to the driving frequency Y4 being a frequency f1. In this case, because a resonance frequency fq1 of the first aluminum container becomes a value lower than the above-described frequency f1, the heating operation may be started at a frequency near the resonance frequency by subtracting the frequency Y7 from the frequency f1. In the case of the second aluminum container of FIG. 6, the output current Iz reaches the second threshold current value It3 in response to the driving frequency Y4 reaching a frequency f2. Therefore, the controller 6 sets a frequency fq2, which is obtained by subtracting the frequency Y7 from the frequency f2, as an initial operating frequency.

—Heating of Aluminum Container—

A heating operation of the aluminum container in operation 35 of FIG. 4B will be described. In the series-parallel resonant circuit 26, the first heating coil 31, the capacitor C1, and the second heating coil 32 are connected in series to form a closed loop circuit. Due to the configuration, a magnetic flux generated in the first heating coil 31 and a magnetic flux generated in the second heating coil 32 cancel each other and thus it is possible to prevent a reduction in heating efficiency.

Equation 1 below is an expression for an impedance Z1 of the second series resonant circuit 25 by using the first heating coil 31 and the capacitor C1, and Equation 2 below is an expression for an impedance Z2 of the second heating coil 32.

$$Z_1=(\alpha+j\beta)/\{j(\omega L_2+\omega M)\} \quad \text{Equation 1}$$

$$Z_2=(\alpha+j\beta)/\{j(\omega L_1+\omega M-1/(\omega C_1))\} \quad \text{Equation 2}$$

$$M=K*\sqrt{(L_1*L_2)} \quad \text{Equation 3}$$

$$\alpha=\omega^2(M^2-L_1*L_2)+L_2/C_1 \quad \text{Equation 4}$$

$$\beta=\omega L_1+\omega L_2-1/(\omega C_1) \quad \text{Equation 5}$$

In Equations 1 and 2, ω is an angular frequency of a current flowing through the heating coil 30, $C_1$ is a capacitance value of the capacitor C1, $L_1$ is an inductance value of the first heating coil 31, and $L_2$ is an inductance value of the second heating coil 32. M is a mutual inductance of $L_1$ and $L_2$, and expressed by Equation 3. In addition, K in Equation 3 is a coupling coefficient of $L_1$ and $L_2$.

The controller 6 controls the switching element 13 to allow an absolute value $|Z_1|$ of the impedance $Z_1$ of the second series resonant circuit 25 to be substantially equal to an absolute value $|Z_2|$ of the impedance Z2 of the second heating coil 32.

Figure 8:
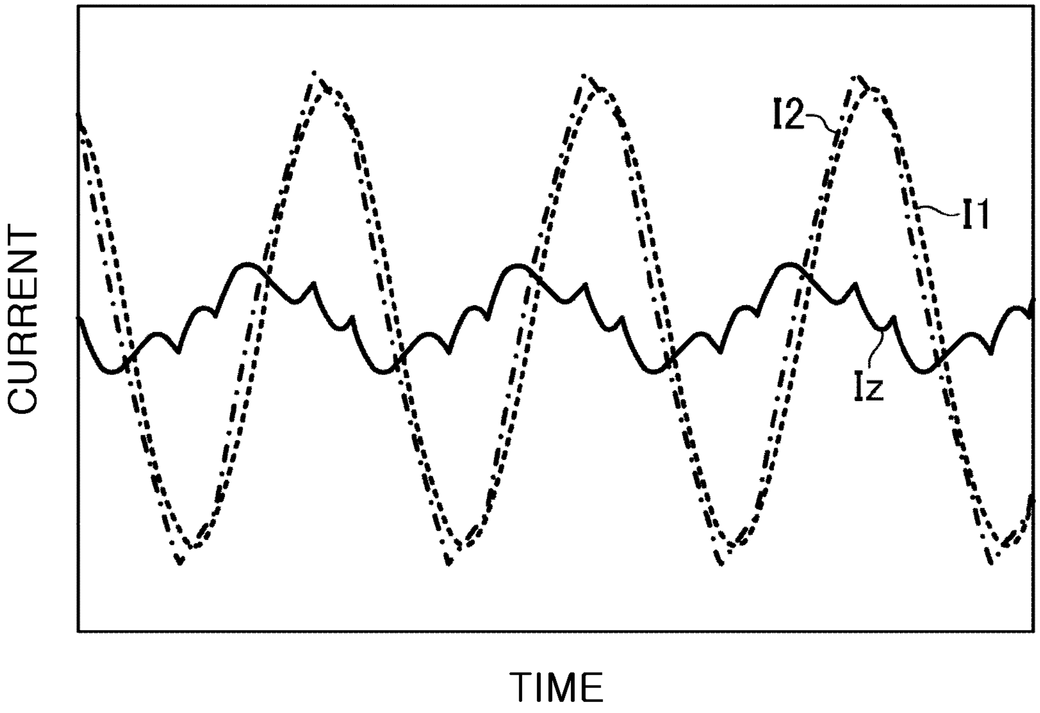
FIG. 8 is a graph illustrating an example of a waveform and a phase of each current in the circuit of FIG. 3B according to an embodiment of the disclosure.

FIG. 8 illustrates that an example of waveform of a first current I1 (dashed line) flowing the second series resonant circuit 25, an example of waveform of a second current I2 (dashed-dotted line) flowing the second heating coil 32, and an example of waveform of an output current Iz (solid line) of the inverter 1 in a case of performing the control according to an embodiment of the disclosure.

Referring to FIG. 8, with respect to a current direction, the first current I1 and the second current I2 are the approximately same phase current. In a case in which a relatively large loop current flows in the closed loop circuit passing through the first relay 21, the second heating coil 32, the first heating coil 31 and the capacitor C1 in the circuit of FIG. 3C, the current Iz flowing through the inverter 1 may be reduced. In a case of heating the stainless steel container having a relatively high impedance, a frequency for heating the first stainless steel container is determined by turning on the second relay 22 and turning off the third relay 23 in the circuit of FIG. 3B (FIG. 13B). Upon performing an initial heating, an initial operating frequency is determined based on the maximum value Izm of the output current Iz. Accordingly, it is possible to prevent that an operation is performed at a frequency lower than the actual resonance frequency. In a case of heating the stainless steel container having a relatively low impedance, the third relay 23 is turned on and the second relay 22 is turned off in the circuit of FIG. 3A (FIG. 13A). In the same manner as the above-mentioned case, an initial operating frequency is determined based on the maximum value Izm of the output current Iz. In order to prevent that the operation is performed at a frequency lower than the actual resonance frequency, a frequency, which is higher than a frequency in which the maximum value Izm of the output current Iz is measured, is set to an initial operating frequency.

By using Equations 1 and 2, the frequency $F_o$ in which the absolute value $|Z_1|$ of impedance ($Z_1$) and the absolute value $|Z_2|$ of impedance ($Z_2$) coincide with each other is expressed as following Equation 6.

$$F_0=1/\{2\pi*\sqrt{(C_1*(L_1+L_2+2M))}\} \quad \text{Equation 6}$$

Figure 9:
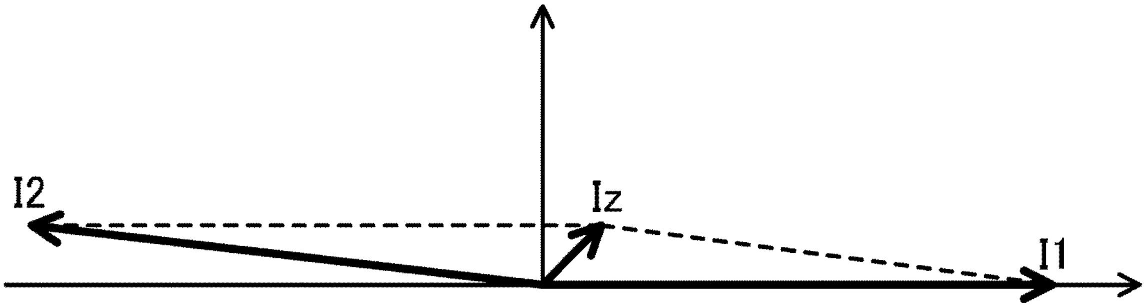
FIG. 9 is a graph illustrating a phase vector of each current in the circuit of FIG. 3B according to an embodiment of the disclosure.

FIG. 9 illustrates phase vectors of the currents I1, I2, and Iz in the case of performing the control according to the embodiment of the disclosure.

Referring to FIG. 9, in performing the control of the embodiment, a phase vector of the first current I1 and a phase vector of the second current I2 are in a phase relationship in substantially opposite directions to each other. Referring to FIG. 8, it can be seen that the value of the output current Iz, which is a combined current of the first current I1 and the second current I2, can be reduced. That is, while maintaining the output current Iz of the inverter 1 at a relatively small value, a relatively large current may flow through the heating coil 30. Therefore, the induction heating apparatus A may be operated with high efficiency.

—Determination Process of Heating Start Frequency for Stainless Steel Container—

FIG. 4C is a flowchart illustrating a process for determining a heating start frequency in the case of the stainless steel container according to an embodiment of the disclosure.

Referring to FIG. 4C, in operation 41, the controller 6 obtains a third set value. Particularly, the controller 6 obtains a set value of a driving frequency Y7 [kHz] and a set value of a duty ratio X7 [%] for driving each switching element 13. The duty ratio X7 [%] is set to a value greater than the duty ratio X4 set in "the determination process of the heating start frequency of the aluminum container". Storing the set value is performed in the same manner as the above-mentioned "container detection process". At the start of the process of FIG. 4C, the resonant circuit 2 is set to the first series resonant circuit 24 or the second series resonant circuit 25.

In response to the termination of the setting in operation 41, the controller 6 fixes the duty ratio X7 [%], and stores the output current Iz of the inverter 1 in the RAM by subtracting a predetermined value β (β<(Y7−Y8)) from the driving frequency from Y7 [kHz] to Y8 [kHz] (Y7>Y8). The sweep of the driving frequency is the same as that of FIG. 4B. A specific flow is indicated by from operation 43 to operation 46.

Figure 10:
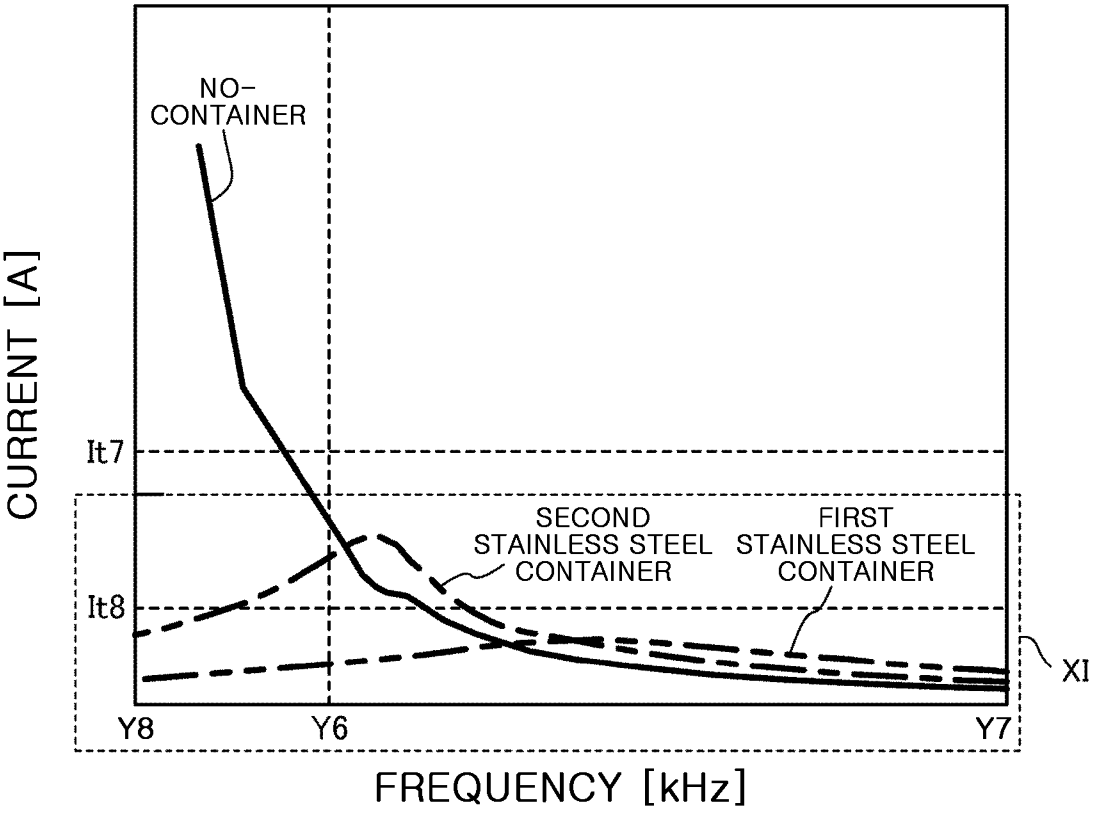
FIG. 10 is a graph illustrating an operation according to the flow of FIG. 4C according to an embodiment of the disclosure.

FIG. 10 illustrates an example of a change in the output current of the inverter 1 based on the driving frequency being reduced from Y7 to Y8 according to an embodiment of the disclosure.

Referring to FIG. 10, it illustrates an example of characteristics in cases such as "no-container" state, the case in which the object to be heated is the first stainless steel container and the case in which the object to be heated is the second stainless steel container.

In operation 43, an output current of the inverter 1 is obtained using the ammeter 9 and stored in a RAM 8. In operation 44, the controller 6 determines whether or not the output current Iz of the inverter 1 exceeds a predetermined fourth threshold current value It7. Based on the output current Iz exceeding the fourth threshold current value It7 (yes in operation 44), the controller 6 determines that it is "displacement of container" and stops the driving of the inverter 1 without the heating operation, and then terminates the process (operation 47). Based on the output current Iz being less than or equal to the fourth threshold current value It7 in operation 44, a new driving frequency Y7 is obtained by subtracting β [kHz] from the driving frequency Y7 in operation 45. In operation 46, the controller 6 determines whether or not the driving frequency Y7 reaches a frequency Y8. The controller 6 repeats the process from operation 43 to operation 46 until the driving frequency Y7 reaches the frequency Y8.

In operation 46, based on the driving frequency Y7 reaching the frequency Y8, the flow proceeds to the next operation 48. In operation 48, the controller 6 determines whether or not the maximum value Izm of the output current Iz stored in the above-described RAM is less than or equal a predetermined fifth threshold current value It8 (It8<It7). For example, the fifth threshold current value It8 is set to a value that is less than the maximum value Izm of the output current Iz in the case in which the object to be heated is the first stainless steel container, and the fifth threshold current value It8 is set to a value that is greater than the maximum value Izm of the output current Iz in the case in which the object to be heated is the second stainless steel container. For example, the threshold current value It8 is set based on a result of experiment or simulation.

Figure 11:
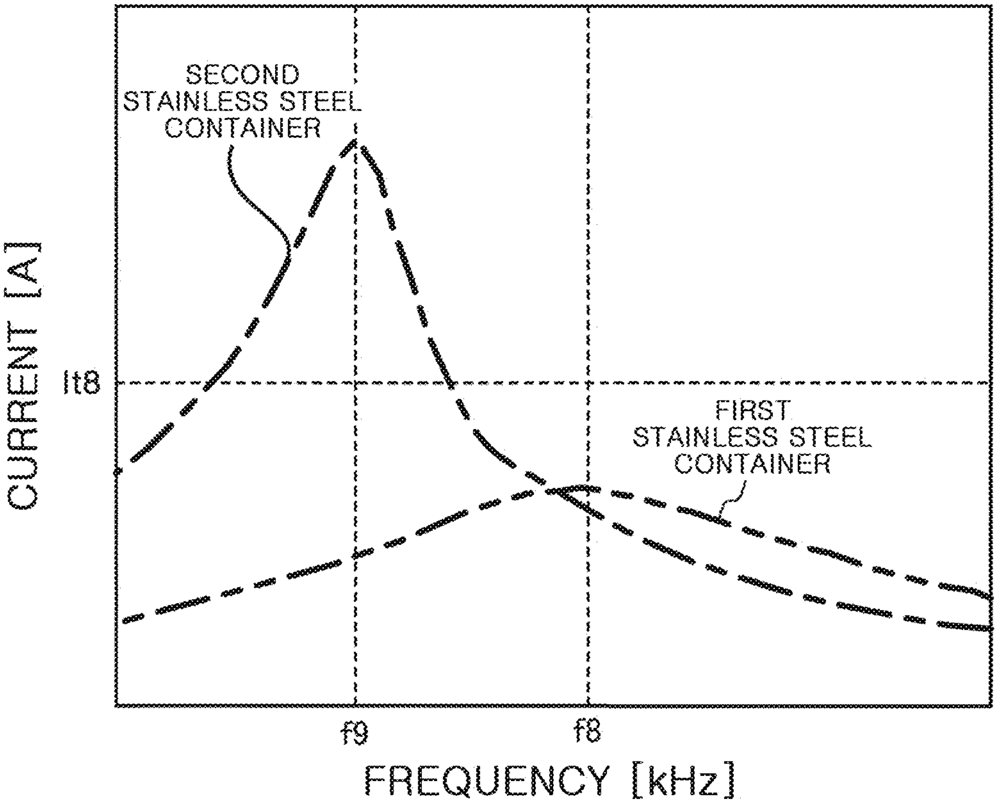
FIG. 11 is an enlarged view of a region XI of FIG. 10 according to an embodiment of the disclosure.

FIG. 11 is an enlarged view of a region XI of FIG. 10 according to an embodiment of the disclosure.

Based on the maximum value Izm of the output current Iz being less than or equal to the fifth threshold current value It8 (yes in operation 48), the controller 6 determines that the object to be heated is the first stainless steel container having the relatively high impedance, and stops the driving of the inverter land prepares for heating of the first stainless steel container in operations 51 and 53. Particularly, the controller 6 turns off the first relay 21 and the third relay 23, and turns on the second relay 22 thereby forming the resonant circuit 2 as the second series resonant circuit 25, referring to FIG. 3B. In addition, as an initial operating frequency for starting heating of the first stainless steel container, the controller 6 determines the initial operating frequency based on the maximum value Izm of the output current Iz. Particularly, according to the characteristic referring to FIG. 11, in the case of the first stainless steel container, the initial operating frequency is set to a value obtained by adding a predetermined frequency γ to a driving frequency f8 in which the maximum value Izm of the output current Iz is measured. The value of the frequency γ varies according to the impedance of the stainless steel container. Because a frequency lower than the frequency f8 operates to increase a temperature of an inverter driver element, it is needed to be always driven at a frequency higher than the frequency f8 even when the impedance of the object to be heated is changed.

Based on the maximum value Izm of the output current Iz exceeding the fifth threshold current value It8 (no in operation 48), the controller 6 determines that the object to be heated is the second stainless steel container having the relatively low impedance, and stops the driving of the inverter 1 and prepares for heating of the second stainless steel container in operations 61 and 63. Particularly, the controller 6 turns on the third relay 23 and turn off the first relay 21 and the second relay 22 thereby forming the resonant circuit 2 as the first series resonant circuit 24, referring to FIG. 3A. In addition, as an initial operating frequency for starting heating of the second stainless steel container, the controller 6 determines the initial operating frequency based on the maximum value Izm of the output current Iz. Particularly, according to the characteristic referring to FIG. 11, in the case of the second stainless steel container, the initial operating frequency is set to a value obtained by adding a predetermined frequency δ to a driving frequency f9 in which the maximum value Izm of the output current Iz is measured. The value of the frequency δ varies according to the impedance of the stainless steel container. Because a frequency lower than the frequency f9 operates to increase a temperature of the inverter driver element, it is needed to be always driven at a frequency higher than the frequency f9 even when the impedance of the object to be heated is changed.

As described above, according to the embodiment, due to the configuration referring to FIG. 1, the series resonant circuit and the parallel resonant circuit may be switched according to the type of container. In addition, because the output of the inverter 1 is connected to the intermediate point P1 of the heating coil 30, a heating operation using all windings of the heating coil 30 and a heating operation using some windings may be switched. Therefore, by classifying objects, which are to be heated and have similar impedances to each other, such as stainless steel containers formed of different materials, it is possible to heat the object, which is to be heated, with the optimum setting for each the object to be heated.

Other Embodiments

Figure 12:
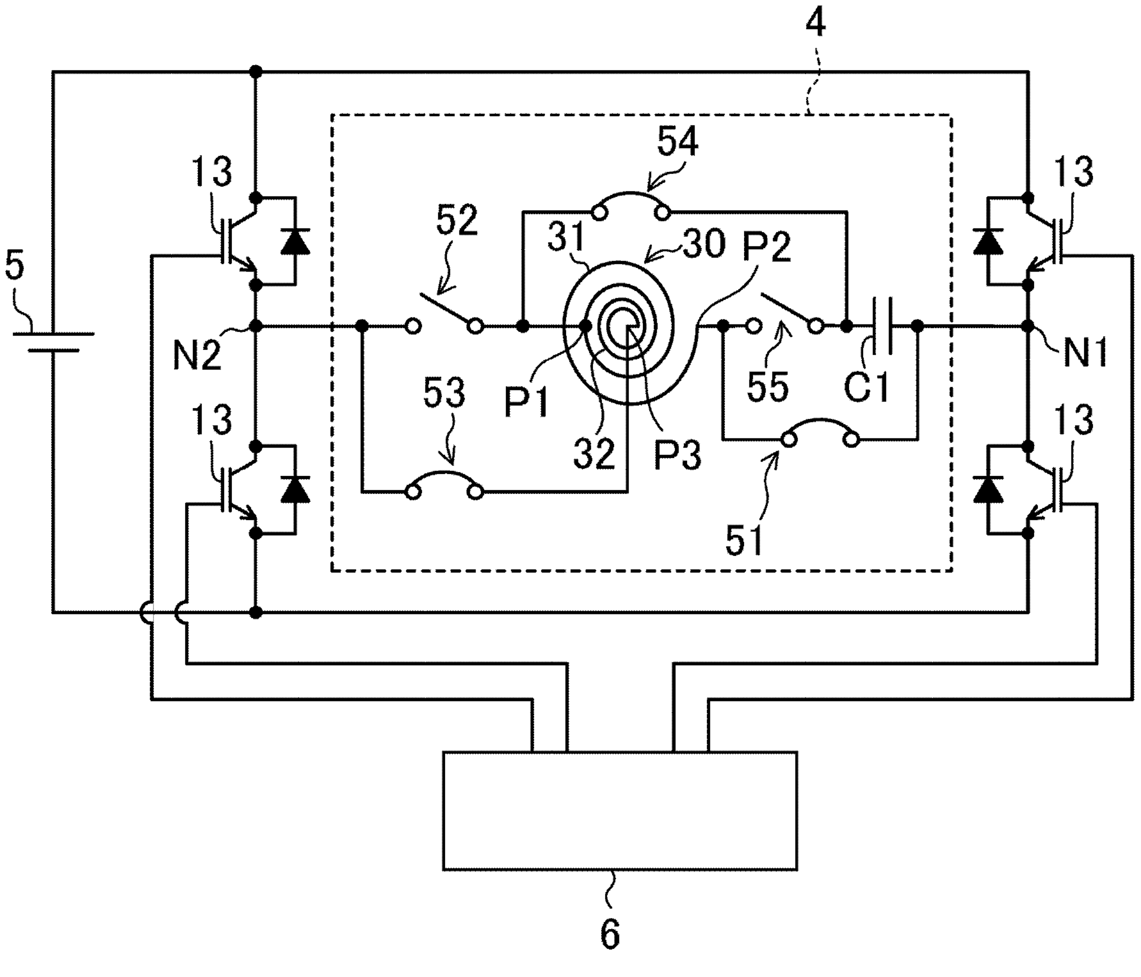
FIG. 12 is s view illustrating of another example of the configuration of the induction heating apparatus according to an embodiment of the disclosure.

In the above embodiment, a configuration shown in FIG. 12 may be used instead of the circuit of FIG. 1. In comparison with that of FIG. 1, the number and arrangement position of relays are different, and accordingly, wiring between each component is different in FIG. 12.

FIG. 12 is configured to provide a circuit switching function as in FIG. 1 and configured to allow a first heating coil 31 and a second heating coil 32 to be in a current direction that does not cancel magnetic flux from each other according to an embodiment of the disclosure. That is, an intermediate terminal of an induction heating coil is connected to a resonant capacitor C1 and thus the other connection point is directly connected to an inverter 1.

Particularly, referring to FIG. 12, a capacitor C1 and a relay 55 are connected in series between a first node N1 and an end P2 of the first heating coil 31. In addition, a relay 51 is provided in parallel with the series circuit of the capacitor C1 and the relay 55. Further, a node between the capacitor C1 and the relay 55 is connected to an intermediate point P1 of a heating coil 30 by a wire, and a relay 54 is provided on the wire. A relay 52 is provided between a second node N2 and the intermediate point P1 of the heating coil 30. A relay 53 is provided between the second node N2 and an end P3 of the second heating coil 32.

An operation of the controller 6 according to the process (processes of FIGS. 4A to 4C) is the same as the above-described embodiment, and thus it is possible to obtain the same operation and effect.

Figure 14:
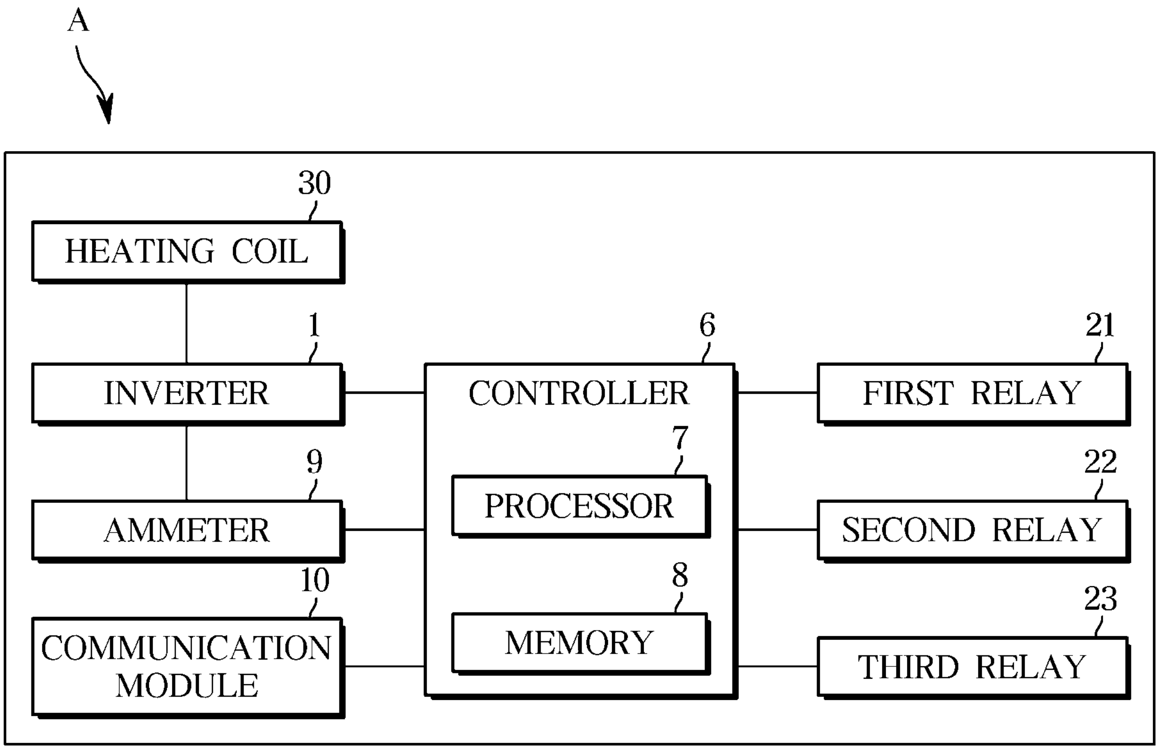
FIG. 14 is a control block diagram of the induction heating apparatus according to an embodiment of the disclosure.

FIG. 14 is a control block diagram of the induction heating apparatus according to an embodiment of the disclosure.

Referring to FIG. 14, the induction heating apparatus A may include the heating coil 30, the inverter 1, the ammeter 9, a communication module 10, the first relay 21, the second relay 22, the third relay 23 and the controller 6. The heating coil 30, the inverter 1, the ammeter 9, the first relay 21, the second relay 22, and the third relay 23 are the same as described above. The controller 6 may be electrically connected to components of the induction heating apparatus A, and may control an operation of each component. For example, the controller 6 may control the inverter 1, the communication module 10, the first relay 21, the second relay 22, and the third relay 23, respectively.

The communication module 10 may perform a connection with an external network. The communication module 10 may be connected to an external network through wired communication or wireless communication. For example, at least one of Radio Frequency (RF), infrared communication, wireless fidelity (Wi-Fi), Bluetooth, Zigbee, and Near Field Communication (NFC) may be applied to the communication module 10. The controller 6 may obtain data through an external network.

The controller 6 may include a processor 7 and the memory 8. The memory 8 may store programs, instructions and data for controlling the operation of the induction heating apparatus A. The processor 7 may generate a control signal for controlling the operation of the induction heating apparatus A based on programs, instructions and data memorized and/or stored in the memory 8. The controller 6 may be implemented as a control circuit in which the processor 7 and the memory 8 are mounted. In addition, the controller 6 may include a plurality of processors and a plurality of memories.

The processor 7 corresponds to hardware and may include a logic circuit and an operation circuit. The processor 7 may process data according to a program and/or instruction provided from the memory 8 and the processor 7 may generate a control signal according to the processing result. The memory 8 may include a volatile memory such as static random access memory (SRAM) or dynamic random access memory (DRAM) for temporarily storing data, and a non-volatile memory such as a Read Only Memory (ROM), an Erasable Programmable Read Only Memory (EPROM) or an Electrically Erasable Programmable Read Only Memory (EEPROM) for storing data for a long period of time.

As is apparent from the above description, as for the induction heating apparatus using a heating coil, it is possible to increase the type of the object to be heated that is heated to the maximum power consumption, and thus it has high Industrial availability.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An induction heating apparatus comprising:
- a heating coil comprising a first heating coil, a second heating coil provided inside the first heating coil, and an intermediate point to which the first heating coil and the second heating coil are connected;
- an inverter is provided in a full-bridge type in which a first arm and a second arm are connected in parallel, wherein each of the first arm and the second arm comprises two switching elements connected in series;
- a first relay provided between a first node and one end of the first heating coil, wherein the first node is an intermediate node arranged between the switching elements of the first arm of the inverter;
- a capacitor provided between the end of the first heating coil and the first node of the inverter;
- a second relay provided between a second node of the second arm of the inverter and the intermediate point of the heating coil;
- a third relay provided between the second node of the inverter and an end of the second heating coil, wherein the end of the second heating coil is on the opposite side of the intermediate point to which the first heating coil and the second heating coil are connected; and
- a processor configured to:
  - detect a presence or an absence of a container on the heating coil, based on an output current of the inverter, and
  - open or close the first relay based on a detection result of the container.

2. The induction heating apparatus of claim 1, wherein the processor is further configured to:
- detect the container based on the output current of the inverter in a state of opening the first relay, and
- open one of the second relay or the third relay and close the other of the second relay or the third relay.

3. The induction heating apparatus of claim 1, wherein the processor is further configured to:
- close the first relay and the second relay, and open the third relay based on a determination that the container is an aluminum container.

4. The induction heating apparatus of claim 1, wherein the processor is further configured to:

open the first relay and the third relay, and close the second relay based on a determination that the container a first stainless steel container.

5. The induction heating apparatus of claim 1, wherein the processor is further configured to:

open the first relay and the second relay, and close the third relay based on a determination that the container is a second stainless steel container having an impedance lower than that of a first stainless steel container.

6. The induction heating apparatus of claim 1, wherein the processor is further configured to:

identify the output current of the inverter while increasing a duty ratio of the inverter to a predetermined value, and determine whether or not the container is present on the heating coil, based on the output current of the inverter exceeding a first threshold current value.

7. The induction heating apparatus of claim 6, wherein the processor is further configured to:

identify the output current of the inverter while reducing a driving frequency of the inverter to a predetermined frequency, and based on the output current of the inverter exceeding a second threshold current value and the driving frequency of the inverter being less than or equal to a threshold frequency, determine that the container is displaced from the heating coil and stop the driving of the inverter.

8. The induction heating apparatus of claim 6, wherein the processor is further configured to:

identify the output current of the inverter while reducing a driving frequency of the inverter to a predetermined frequency, and wherein, based on the output current of the inverter exceeding a second threshold current value and the driving frequency of the inverter exceeding a threshold frequency, the processor determines that the container is an aluminum container.

9. The induction heating apparatus of claim 8, wherein the processor is further configured to determine that the container is a stainless steel container based on the output current of the inverter being less than or equal to a third threshold current value that is less than a second threshold current value.

10. The induction heating apparatus of claim 9, wherein the processor is further configured to:

reset the duty ratio and driving frequency of the inverter, identify the output current of the inverter while reducing the driving frequency of the inverter to a predetermined frequency, and determine that the container is displaced from the heating coil and stops the driving of the inverter based on the output current of the inverter exceeding a fourth threshold current value.

11. The induction heating apparatus of claim 10, wherein the processor is further configured to determine that the container is a first stainless steel container based on the output current of the inverter being less than or equal to a fifth threshold current value that is less than the fourth threshold current value.

12. The induction heating apparatus of claim 10, wherein the processor is further configured to determine that the container is a second stainless steel container having an impedance lower than that of a first stainless steel container based on the output current of the inverter being less than or equal to the fourth threshold current value and exceeding a fifth threshold current value less than the fourth threshold current value.

13. An induction heating apparatus comprising:

a heating coil configured to heat a container and comprising:

a first heating coil, a second heating coil, and an intermediate point to which the first heating coil and the second heating coil are connected;

an inverter provided in a form of a full bridge in which a first arm and a second arm are connected in parallel, wherein each of the first arm and the second arm comprises two switching elements connected in series;

a capacitor provided between an end of the first heating coil and a first node of the first arm of the inverter, the first node is an intermediate node arranged between the switching elements of the first arm;

a first relay provided between a second node of the second arm of the inverter and an end of the second heating coil, the end of the second heating coil is on the opposite side of the intermediate point to which the first heating coil and the second heating coil are connected;

a second relay provided between the second node of the inverter and the intermediate point of the heating coil; and a processor configured to:

detect a presence or an absence of the container on the heating coil, based on an output current of the inverter, and open one of the first relay and the second relay and close the other of the first relay and the second relay based on a detection result of the container.

14. The induction heating apparatus of claim 13, wherein the processor is further configured to open the first relay and close the second relay based on a determination that the container is a first stainless steel container.

15. The induction heating apparatus of claim 13, wherein the processor is further configured to close the first relay and open the second relay based on a determination that the container is a second stainless steel container having an impedance lower than that of a first stainless steel container.

16. The induction heating apparatus of claim 13, wherein the processor configured to identify the output current of the inverter while reducing a driving frequency of the inverter to a predetermined frequency, and wherein based on the output current exceeding a first threshold current value, the processor determines that the container is displaced from the heating coil and stops the driving of the inverter.

17. The induction heating apparatus of claim 16, wherein the processor is further configured to determine that the container is a first stainless steel container based on the output current being less than or equal to a second threshold current value that is less than the first threshold current value.

18. The induction heating apparatus of claim 16, wherein the processor is further configured to determine that the container is a second stainless steel container having an impedance lower than that of a first stainless steel container based on the output current of the inverter being less than or equal to the first threshold current value and exceeding a second threshold current value less than the first threshold current value.

* * * * *